United States Patent [19]
Koyama et al.

[11] Patent Number: 5,578,143
[45] Date of Patent: Nov. 26, 1996

[54] CONTINUOUSLY CAST SLAB OF EXTREMELY LOW CARBON STEEL WITH LESS SURFACE DEFECTS IN STEEL SHEET-PRODUCING STEP; EXTREMELY LOW CARBON SHEET STEEL; AND PROCESS FOR PRODUCING THE SAME

[75] Inventors: Kazuo Koyama; Eiichi Takeuchi; Masayoshi Suehiro, all of Futtsu, Japan

[73] Assignee: Nippon Steel Corporation, Tokyo, Japan

[21] Appl. No.: 500,883

[22] PCT Filed: Nov. 21, 1994

[86] PCT No.: PCT/JP94/01964

§ 371 Date: Jul. 21, 1995

§ 102(e) Date: Jul. 21, 1995

[87] PCT Pub. No.: WO95/14794

PCT Pub. Date: Jun. 1, 1995

[30] Foreign Application Priority Data

| Nov. 22, 1993 | [JP] | Japan | 5-314005 |
| Dec. 22, 1993 | [JP] | Japan | 5-325396 |
| Oct. 18, 1994 | [JP] | Japan | 6-277228 |

[51] Int. Cl.⁶ ............... B22D 27/02; B32B 15/18; C21D 1/04
[52] U.S. Cl. ............ 148/319; 148/541; 148/565; 148/903; 428/682; 164/498; 164/473
[58] Field of Search ............... 148/541, 565, 148/902, 903, 320, 330, 319; 164/476, 477, 473, 498, 500, 91; 428/682

[56] References Cited

FOREIGN PATENT DOCUMENTS

| 62-40352 | 2/1987 | Japan . |
| 62-119035 | 5/1987 | Japan . |
| 63-108947 | 5/1988 | Japan . |
| 1-149943 | 6/1989 | Japan . |
| 3-199343 | 8/1991 | Japan . |
| 4-2661 | 1/1992 | Japan . |
| 4-168246 | 6/1992 | Japan . |
| 4-191331 | 7/1992 | Japan . |

(List continued on next page.)

OTHER PUBLICATIONS

Suminaga et al., "Prevention Of Rolled-In-Scale Problems In Ultra Low Carbon Steels", CAMP-ISIJ vol. 6 (1993)-1328.
Tsuyama et al., "Hot Ductility Of Ultra-Low Carbon Steels", CAMP-ISIJ vol. 6 (1993)-1332.

Primary Examiner—Deborah Yee
Attorney, Agent, or Firm—Wenderoth, Lind & Ponack

[57] ABSTRACT

(Object) IF-based, continuously cast slab essentially freed from defects such as surface defects, difficult production and poor strength, etc. of the product that the IF-based sheet steels have; sheet steels and a process for producing the same are provided.

(Structure) A continuously cast slab of extremely low carbon steel comprising not more than 1.5% by mass of Si, not more than 2.0% by mass of Mn, not ore than 0.15% by mass of P, 0.01–0.15% by mass of Al, and not more than 0.0050% by mass of N, where the surface layer further contains 0.01–0.08% by mass of C existing as a cementite and the inner layer further contains not more than 0.0050% by mass of C, and at least one of 0.02–0.10% by mass of Ti, 0.01–0.10% by mass of Nb, 0.02–0.10% by mass of V and 0.03–0.10% by mass of Zr, the carbon existing substantially as carbides of these elements, preferably both the surface layer and the inner layer further contain 0.0001–0.0015% by mass of B, the balance being Fe and inevitable impurities; an sheet steel made from the slab; and a process for producing the slab and the sheet steel, combined with continuously casting powder, an electromagnetic brake and an alloy-adding wire.

(Effect) The IF steel and its high strong steel, which have been suffered from impaired mass production, lower production yield and incomplete product characteristics have been established as satisfactory basis metallic materials.

38 Claims, 3 Drawing Sheets

FOREIGN PATENT DOCUMENTS

| | | |
|---|---|---|
| 4-191330 | 7/1992 | Japan . |
| 4-279249 | 10/1992 | Japan . |
| 4-313447 | 11/1992 | Japan . |
| 4-313448 | 11/1992 | Japan . |
| 4-351248 | 12/1992 | Japan . |
| 5-237599 | 9/1993 | Japan . |
| 6-47706 | 6/1994 | Japan . |

5,578,143

CONTINUOUSLY CAST SLAB OF EXTREMELY LOW CARBON STEEL WITH LESS SURFACE DEFECTS IN STEEL SHEET-PRODUCING STEP; EXTREMELY LOW CARBON SHEET STEEL; AND PROCESS FOR PRODUCING THE SAME

TECHNICAL FIELD

The present invention relates to a continuously cast slab of extremely low carbon steel with less surface defects in a steel sheet-producing step; an extremely low carbon sheet steel; and a process for producing the same, and more particularly to an extremely low carbon sheet steel with a good shapability now in much use. Thus, the present invention relates not only to iron-making technology for producing the steel sheets, but also to a broad range of industrial field including automobiles, household electric appliances, housing materials, etc. as their consumers.

BACKGROUND ART (Prior Art)

Extremely low carbon steel produce by reducing the carbon content of steel refined in the steel-making process to a few 10 ppm in a vacuum degassing apparatus such as RH, etc., and further by adding carbide-nitride-forming elements such as Ti, Nb, etc. thereto, thereby fixing the remaining carbon, that is, the so called IF steel (interstitial free steel) has a very excellent formability such as deep drawing, etc. and is now much used in automobile application, etc. IF-based, high strength sheet steel, intensified by adding solid solution-strengthening elements such as P, Mn, etc. to the IF steel has also now established a dominant position as the main steel species of high strength sheet steels. However, the IF steel has several process and product drawbacks.

First process drawback is a surface defect. IF steel is vacuum degassed in the steel-making process, and consequently the oxygen content is increased owing to the CO equilibrium, and thus deoxidation is carried out. It is hard to completely remove the deoxidation products, which are liable to remain as inclusions.

Furthermore, solidification in the continuous casting process substantially eliminates carbon, and thus there are no coexisting solid-liquid zones substantially at all. Unstability such as a temperature fluctuation, etc. is directly connected to unstability of steel slab quality, resulting in deterioration of surface properties. Furthermore, the IF steel can be deemed to be nearly pure iron in the composition and has a higher $Ar_3$ transformation point. Thus, the hot rolling finishing temperature must be made higher, resulting in inevitable generation of surface defects. The serious situation can be understood by a forum "Technique to prevent surface defects in the hot rolling and heavy plate rolling" held in No. 126 Autumn Lecture Conference of Japan Iron and Steel Institute, where the IF steel was taken as the main subject (see, for example, Lecture summary, CAMP-ISIJ, vol. 6, pp 1328–1331 and pp 1332–1335). In spite of the forum, measures to be taken were of on-the-spot type and allopathic and no fundamental solution was made at all yet.

Other drawbacks include several types, depending on differences in species of sheet steels and surface treatment, such as cold rolled steel sheets, electroplated steel sheets, and hot zinc-dipped steel sheets. The IF steel is generally sensitive to the nature of surface treatment. Particularly the iron-zinc alloy coated steel (galvannealed steel) is strongly influenced by steel components. Thus, in case of cold rolled steel sheets and galvannealed steel sheets, it is an ordinary expedient to classify the IF steel, depending on their purposes. For example, Nb-contained IF steel having a better hot dip galvanizing property is preferably used for the galvannealed products, whereas Ti-containing IF steel having a high Lankford value (hereinafter referred to as "a r value") as an indicator of material quality, particularly deep drawability is preferably used for the cold rolled steel sheet, as classified depending on the purposes. This is true also of IF-based high strength steel sheets. However, the minute classification of steel species was against the mass production as the basis of iron and steel industries and largely deteriorated the economy.

Still furthermore, satisfactory metallographic structure cannot be obtained at the heat-influenced parts of welded joints, because the IF steel is extremely low carbon steel. Thus, the IF steel has such a drawback that strength or fatigue characteristics is deteriorated at sites subject to heat influence such as sites subject to spot welding. To overcome the drawback, some measures have been taken, for example, to modify the component system (JP-B-4-2661). However, restriction to the component system to this effect has given rise to another disadvantages such as limited applications or a failure to completely utilize its component system from the viewpoint of workability, etc. and also to an economic loss due to addition of alloying elements.

Many patent applications have been so far filed as to steel sheets comprising a plurality of layers, as in the present invention. For example, JP-A-4-191330 and JP-A-4-191331 disclose that a high strength such as a high dent resistance, etc. can be obtained by using at least one layer made from alloy steel containing a large amount of C, Mn, Si, P, etc.

However, these inventions attempt to obtain novel functions in the strength, formability, etc. by substantially changing mechanical properties of the surface layers and the inner layer. Thus, generally the surface layers have a larger thickness or the surface layers are set to have a higher strength JP-B-6-47706 discloses a technique of surface carburizing of the IF steel, where the product carburized layer has a larger thickness and the technique is not directed to overcoming if process defects as in the present invention.

As to a process for producing a sheet steel comprising a plurality of layers as in the present invention, JP-A-63-108947, for example, discloses a process utilizing a static magnetic field as a means for separating different species of molten steel metals poured into a mold, where the static magnetic field is so formed that a line of magnetic force can be extended at a uniform density over the entire width of molten slab in the direction perpendicular to the casting direction, and different species of molten metals are supplied to the molten slab separated into an upper molten steel pool and a lower molten steel pool by the generated static magnetic field zone as a boundary. As a result of suppressing intermixing of the upper and lower molten steel pools by the static magnetic field, the metal of the upper molten steel pool and the metal of the lower molten steel pool can be separated from each other and solidified individually as a surface layer and an inner layer, respectively, to form a slab having a plurality of layers.

(Problems to be solved by the Invention)

Object of the present invention is to completely overcome various defects of IF-based sheet steels as mentioned above, that is, 1. Surface defects due to the fact that IF sheet steels can be deemed to be nearly as pure iron containing substantially no carbon, 2. Minute classification of steel species into cold rolled steel sheets, electroplated steel sheets and hot dip galvanized steel sheets due to use of or differences in the surface treatment, and
3. Shortage of product strength such a deterioration of fatigue characteristics at welded parts, thereby converting the IF-based sheet steels into a basic material affirmed from the viewpoints of properties and economy.

DISCLOSURE OF THE INVENTION

To solve the above-mentioned problems, the present invention provides a slab, a steel sheet and a process for producing the same, as described in the following items (1) to (38):

(1) A continuously cast slab of extremely low carbon steel with less surface defects in a hot rolling, cold rolling, annealing or surface treatment step, which comprises a cast slab containing not more than 1.5% by mass of Si, not more than 2.0% by mass of Mn, not more than 0.15% by mass of P, 0.01–0.15% by mass of Al and not more than 0.005% by mass of N, and a surface layer of said cast slab further containing 0.01–0.08% by mass of C existing as a cementite, and an inner layer of said cast slab further containing not more than 0.0050% by mass of C and at least one of 0.02–0.10% by mass of Ti, 0.01–0.10% by mass of Nb, 0.02–0.10% by mass of V and 0.03–0.10% by mass of Zr, the carbon being present substantially as carbides of the said elements, and the balance being Fe and inevitable impurities.

(2) A continuously cast slab of extremely low carbon steel with less surface defects in a hot rolling, cold rolling, annealing or surface treatment step, as described in item (1), where the surface layer and the inner layer each further contain 0.0001–0.0015% by mass of B.

(3) A continuously cast slab of extremely low carbon steel, as described in item (1), wherein the surface layer contains 0.01–0.08% by mass of C as cementite, 0.1–0.4% by mass of Mn, not more than 0.08% by mass of P and 0.01–0.10% by mass of Al, and further contains at least one of 0.01–0.08% by mass of Ti and 0.01–0.08% by mass of Nb when required, the balance being Fe and inveitable impurities, and the inner layer contains not more than 0.0050% by mass of C, 0.1–0.4% by mass of Mn, not more than 0.08% by mass of P and 0.01–0.10% by mass of Al, and further contains at least one of 0.02–0.08% by mass of Ti and 0.01–0.08% by mass of Nb, the balance being Fe and inevitable impurities.

(4) A continuously cast slab of extremely low carbon steel, as described in item (3), wherein the surface layer and the inner layer each further contain 0.0001–0.0010% by mass of B.

(5) A continuously cast slab of extremely low carbon steel as described in any one of items (1)–(4), wherein total thickness of the surface layer on both sides of the slab is 5–15% of that of the inner layer.

(6) A continuously cast slab of extremely low carbon steel as described in item (5), wherein total thickness of the surface layer on both sides of the slab is 5.0–9.0% of that of the inner layer.

(7) An extremely low carbon sheet steel with less surface defects in steel sheet-producing step, which comprises a sheet steel containing not more than 1.5% by mass of Si, not more than 2.0% by mass of Mn, not more than 0.15% by mass of P, 0.01–0.15% by mass of Al and not more than 0.0050% by mass of N, and a surface layer of said sheet steel further containing 0.01–0.08% by mass of C existing as a cementite, and an inner layer of said sheet steel containing not more than 0.0050% by mass of C, and further containing at least one of 0.02–0.10% by mass of Ti, 0.01–0.10% by mass of Nb, 0.02–0.10% by mass of V and 0.03–0.10% by mass of Zr, the carbon being present substantially as carbides of the said elements, and the balance being Fe and inevitable impurities.

(8) An extremely low carbon sheet steel as describes in item (7), wherein the surface layer and the inner layer each contain 0.0001–0.0015% by mass of B.

(9) An extremely low carbon sheet steel, as described in item (7), wherein the surface layer contains 0.01–0.08% by mass of C, 0.05–0.40% by mass of Mn, 0.01–0.10% by mass of Al and not more than 0.0050% by mass of N, the balance being Fe and inevitable impurity elements, and the inner layer contains not more than 0.0050% by mass of C, 0.05–0.40% by mass of Mn, 0.01–0.1% by mass of Al, not more than 0.0050% by mass of N and 0.02–0.08% by mass of Ti, the balance being Fe and inevitable impurity elements.

(10) An extremely low carbon sheet steel as described in item (9), wherein the surface layer contains 0.01–0.08% by mass of C, 0.05–0.40% by mass of Mn, 0.01–0.10% by mass of Al, not more than 0.0050% by mass of N and 0.0001–0.0010% by mass of B, the balance being Fe and inevitable impurity elements, and the inner layer contains not more than 0.0050% by mass of C, 0.05–0.40% by mass of Mn, 0.01–0.10% by mass of Al, not more than 0.0050% by mass of N, 0.02–0.08% by mass of Ti and 0.0001–0.0010% by mass of B, the balance being Fe and inevitable impurity elements.

(11) An extremely low carbon sheet steel, as described in item (7), wherein the surface layer contains 0.01–0.08% mass of C, 0.1–0.4% by mass of Mn, not more than 0.08% by mass of P, 0.01–0.10% by mass of Al and further contains at least one of 0.01–0.08% by mass of Ti and 0.01–0.08% by mass of Nb, if required, the balance being Fe and inevitable impurities, and an inner layer contains not more than 0.050% by mass of C, 0.1–0.4% by mass of Mn, not more than 0.08% by mass of P and 0.01–0.10% by mass of Al, and further contains at least one of 0.02–0.08% by mass of Ti and 0.01–0.08% by mass of Nb, the balance being Fe and inevitable impurities.

(12) An extremely low carbon sheet steel, as described in item (11), wherein the surface layer and the inner layer each further contain 0.0001–0.0010% by mass of B.

(13) An extremely low carbon sheet steel, as described in any one of items (7)–(12), wherein total thickness of the surface layer on both sides of the sheet steel is not more than 8% of that of the inner layer.

(14) An extremely low carbon sheet steel, as described in item (13), wherein total thickness of the surface layer on both sides of the sheet steel is 2–8% of that of the inner layer.

(15) A process for producing a continuously cast slab of extremely low carbon steel with less surface defects in a hot rolling, cold rolling, annealing or surface treatment step by continuous casting comprising applying a direct current magnetic field, which crosses the thickness of slab at a lower level position in the casting direction than the meniscus of molten steel poured into a continuously casting mold, to the molten steel, thereby forming a direct current magnetic field zone, and conducting casting while separating the molten steel into an upper molten steel pool and a lower molten steel pool by the direct current magnetic field zone, thereby forming a slab comprising a plurality of layers, where a surface layer and an inner layer have different steel compositions, characterized by pouring molten steel containing not more than 0.0050% by mass of C, not more than 1.5% by mass of Si, not more than 2.0% by mass of Mn, not more than 0.15% by mass of P, 0.01–0.15% by mass of Al and not more than 0.0050% by mass of N, the balance being Fe and inevitable impurities into the continuously casting mold, supplying carbon-containing powder to the surface of the upper molten steel pool separated by the direct current magnetic field zone, thereby adding 0.01–0.08% by mass of C to the surface layer, and inserting a Fe-coated alloy wire containing at least one of Ti, Nb, V and Zr into the lower molten steel pool, thereby adding at least one of 0.02–0.10% by mass of Ti, 0.01–0.10% by mass of Nb, 0.02–0.10% by mass of V and 0.03–0.10% by mass of Zr to the inner layer.

(16) A process for producing a continuously cast slab of extremely low carbon steel with less surface defects in a hot rolling, cold rolling, annealing or surface treatment step, as described in item (15), where the surface layer and the inner layer each further contain 0.0001–0.0015% by mass of B.

(17) A process for producing a continuously cast slab of extremely low carbon steel, as described in item (15) or (16), wherein the molten steel poured into the continuously cast mold is made to contain not more than 0.0025% by mass of carbon, and the inner layer is made to contain 0.025–0.040% by mass of Ti, and further a heating temperature for the hot rolling is made to be not more than 1,100° C.

(18) A process for producing a continuously cast slab of extremely low carbon steel, as described in item (17), wherein the inner layer further contains 0.01–0.02% by mass of Nb.

(19) A process for producing a continuously cast slab of extremely low carbon steel, as described tin any one of items (15)–(17), wherein the powder contain 0.5–10% by mass of C.

(20) A process for producing a continuously cast slab of extremely low carbon steel with less surface defects in a hot rolling, cold rolling, annealing or surface treatment step, as described in item (15), by continuous casting comprising applying a direct current magnetic field, which crosses the thickness of slab at a lower level position in the casting direction than the meniscus of molten steel poured into a continuously casting mold, to the molten steel, thereby forming a direct current magnetic field zone, and conducting casting while separating the molten steel into an upper molten steel pool and a lower molten steel pool by the direct current magnetic field zone thereby forming a slab comprising a plurality of layers, where a surface layer and an inner layer have different steel compositions, characterized by pouring molten steel containing not more than 0.0050% by mass of C, 0.1–0.4% by mass of Mn, not more than 0.08% by mass of P and 0.01–0.10% by mass of Al, and further containing at least one of 0.01–0.08% by mass of Ti and 0.01–0.08% by mass of Nb, the balance being Fe and inevitable impurities into the continuously casting mold, and supplying carbon-containing powder to the surface of the upper molten steel pool separated by the direct current magnetic field zone, thereby adding 0.01–0.08% by mass of C to the slab surface layer.

(21) A process for producing a continuously cast slab of extremely low carbon steel as described in item (20), where the surface layer and the inner layer each further contain 0.0001–0.0010% by mass of B.

(22) A process for producing a continuously cast slab of extremely low carbon steel, as described in item (20) or (21), wherein the powder contains 0.5–5% by mass of C.

(23) A process for producing an extremely low carbon sheet steel with less surface defects in a steel sheet-making step by continuous casting comprising applying a direct current magnetic field, which crosses the thickness of slab at a lower level position in the casting direction than the meniscus of molten steel poured into a continuously casting mold, to the molten steel, thereby forming a direct current magnetic field zone, and conducting casting while separating the molten steel into an upper molten steel pool and a lower molten steel pool by the direct current magnetic field zone, thereby forming a slab comprising a plurality of layers, where a surface layer and an inner layer have different steel compositions, characterized by pouring molten steel containing not more than 0.0050% by mass of C, not more than 1.5% by mass of Si, not more than 2.0% by mass of Mn, not more than 0.15% by mass of P, 0.01–0.15% by mass of Al and not more than 0.0050% by mass of N, the balance being Fe and inevitable impurities, into the continuously casting mold, supplying carbon-containing powder to the surface of the upper molten steel pool separated by the direct current magnetic field zone, thereby adding 0.01–0.08% by mass of C to the surface layer, inserting a Fe-coated alloy wire containing at least one of Ti, Nb, V and Zr into the lower molten steel pool, thereby adding at least one of 0.02–0.10% by ass of Ti, 0.01–0.10% by mass of Nb, 0.02–0.10% by mass of V and 0.03–0.10% by mass of Zr to the inner layer, thereby obtaining the continuously cast slab of extremely low carbon steel, and then subjecting the continuously cast slab to ordinary hot rolling, or ordinary hot rolling—pickling—cold rolling—recrystallization annealing or ordinary hot rolling—pickling—cold rolling—surface treatment.

(22) A process for producing an extremely low carbon sheet steel, as described in item (23), wherein the surface layer and the inner layer each further contain 0.0001–0.0015% by mass of B.

(25) A process for producing an extremely low carbon sheet steel, as described in item (23), wherein molten steel containing not more than 0.0050% by mass of C, 0.05–0.40% by mass of Mn, 0.01–0.10% by mass of Al and not more than 0.0050% by mass of N, the balance being Fe and inevitable impurity elements, is produced and then subjected to continuous casting, thereby obtaining a slab while providing an electromagnetic brake at a mold, adding C-containing powder to the upper surface in the mold, thereby making the surface layer contain 0.01–0.08% by mass of C and inserting a Fe-coated wire of Ti alloy into the mold, thereby making the inner layer containing 0.02–0.08% by mass of Ti, and then the slab is subjected to ordinary hot rolling.

(26) A process for producing an extremely low carbon sheet steel, as described in item (25), wherein molten steel containing not more than 0.0050% by mass of C, 0.05–0.40% by mass of Mn, 0.01–0.10% by mass of Al, not more than 0.0050 by mass of N and 0.0001–0.0010% by mass of B, the balance being Fe and inevitable impurity elements, is produced and then subjected to continuous casting, thereby obtaining a slab, while providing an electromagnetic brake at a mold, adding C-containing powder to the upper surface in the mold, thereby making the surface layer contain 0.01–0.08% by mass of C and inserting a Fe-coated wire of Ti alloy into the mold, thereby making the inner layer contain 0.02–0.08% by mass of Ti, and the slab is subjected to ordinary hot rolling.

(27) A process for producing an extremely low carbon sheet steel with less surface defects in a steel sheet-producing step, as described in item (23), by continuous casting comprising applying a direct current magnetic field, which crosses the thickness of slab at a lower level position in the casting direction than the meniscus of molten steel poured into a continuously casting mold, to the molten steel, thereby forming a direct current magnetic field zone, and conducting casting while separating the molten steel into an upper molten steel pool and a lower molten steel pool by the direct current magnetic field zone, thereby forming a slab comprising a plurality of layers, where a surface layer and an inner layer have different steel compositions, characterized by pouring molten steel containing not more than 0.0050% by mass of C, 0.1–0.4% by mass of Mn, not more than 0.08by mass of P and 0.01–0.10% by mass of Al, and further containing at least one of 0.01–0.08% by mass of Ti and 0.01–0.08% by mass of Nb, the balance being Fe and inevitable impurities into the continuously casting mold, and supplying carbon-containing powder to the surface of the upper molten steel pool separated by the direct current magnetic field zone, thereby adding 0.01–0.08% by mass of C to the slab surface layer to produce a continuously cast slab of extremely low carbon steel, and then further subjecting the continuously cast slab of extremely low carbon steel to ordinary hot rolling or ordinary hot rolling—pickling—cold rolling—recrystallization annealing or hot rolling—pickling—cold rolling—surface treatment.

(28) A process for producing an extremely low carbon sheet steel, as described in item (27), wherein the surface layer and the inner layer each further contain 0.0001–0.0010% by mass of B.

(29) A process for producing an extremely low carbon sheet steel, as described in any one of items (23)–(28), wherein the ordinary hot rolling—pickling—cold rolling is carried out and the recrystallization annealing and galvanizing are carried out in a continuous hot dip galvanizing line.

(30) A process for producing an extremely low carbon sheet steel, as described in any one of items (23)–(29), wherein the treatment in the continuous hot dip galvanizing line is carried out by galvanizing and then an ordinary alloying treatment to zinc phase.

(31) A process for producing an extremely low carbon sheet steel, as described in any one of items (23)–(30), wherein the hot rolling is carried out on the continuously cast slab in the ordinary manner comprising subjecting the slab to direct hot rolling at 1,050°–1,200° C. or heating—rough rolling—finish rolling, where the finish rolling end temperature is above the $Ar_3$ tranformation point or may be below the $Ar_3$ transformation point within a range of evading a ridging-like skin toughening, followed by cooling, coiling at about 550°–690° C., further cooling, pickling if required and an appropriate finishing treatment, thereby obtaining a hot rolled steel sheet or hot rolled coil.

(32) A process for producing an extremely low carbon sheet steel, as described in item (31), wherein the finish rolling end temperature is [$Ar_3$ transformation point—20] –950° C.

(33) A process for producing an extremely low carbon sheet steel, as described in any one of items (23)–(32), wherein in the hot rolling—pickling—cold rolling—recrystallization annealing, cold rolling is carried out in the ordinary manner comprising cold rolling the pickled, hot rolled coil in a cold rolled ratio of 60–85%, and conducting the recrystallization annealing by box annealing under annealing conditions of 650°–750° C. for 1–20 hours, or by continuous annealing under annealing conditions of 700°–900° C. for 10 sec. to 10 min., thereby obtaining a cold rolled steel sheet or a cold rolled coil.

(32) A process for producing an extremely low carbon sheet steel, as described in any one of items (23)–(33), wherein in the hot rolling—pickling—cold rolling—surface treatment, the surface treatment is carried out in the ordinary manner comprising passing the cold rolled coil through an electrogalvanizing line or an electrogalvanizing-alloying line, thereby obtaining a pure zinc coated steel sheet or zinc alloy coated steel sheet.

(35) A process for producing an extremely low carbon sheet steel, as described in item (34), wherein the electrogalvanizing is an ordinarly pure zinc plating.

(36) A process for producing an extremely low carbon sheet steel, as described in item (34), wherein the electrogalvanizing-alloying is plating of Zn—Ni alloy containing zinc as the major component.

(37) A process for producing an extremely low carbon sheet steel, as described in any one of items (23)–(33), wherein in the hot rolling—pickling—cold rolling—surface treatment, the surface treatment is carried out in the ordinary manner comprising passing the cold rolled coil through a continuous hot dip galvanizing line under conditions of 700°–900° C. for 10 sec.–10 min., thereby obtaining a hot dip galvanized steel sheet.

(38) A process for producing an extremely low carbon sheet steel, as described in any one of items (23)–(33) and (37), wherein in the hot rolling—pickling—cold rolling—surface treatment, the surface treatment is carried out in the ordinary manner comprising passing the cold rolled coil through a continuous hot dip galvanizing line under conditions of 700°–900° C. for 10 sec.–10 min., thereby obtaining a hot dip galvanized steel sheet and then making a galvannealed steel sheet at a pot dipping temperature of 420°–480° C., under alloying conditions of 480°–600° C. for 1–60 sec., and in a modification rolling ratio of 0.2–2% and a zinc deposit of 20–120 g/m².

(Function)

The present invention will be described in detail below.

The present invention is to effectively utilize carbon-containing powder for use for keeping the upper surface of molten steel hot in the continuously casting operation. That is, an electromagnetic brake is provided at the lower part of a continuously casting mold to separate the surface layer and the inner layer from each other by the electromagnetic brake effect. Due to this action, carbon is introduced only into the slab surface layer from the powder, and the surface flaws or surface defects generated during the hot rolling, cold rolling or annealing are to be completely eliminated in the present invention. The surface defects include various types, and the present invention is effective for a wide range of surface defects including ordinary defects of scale origin, defects of liquid film embrittling, very small cracks generated on the surface layer by heating for hot rolling, fine flaws of scale origin, and flaws or surface defects to appear in the later steps due to remaining fine scales.

Furthermore, elimination of surface defects can be expected by improvement of solidification state. That is, the conventional IF steel has an extremely small solid-liquid coexisting region, when viewed from its components, and small fluctuations in the temperature give rise to fluctuations in the solidified shell thickness and have an influence on segregation etc. on the solid-liquid boundary. Thus, such defects as powder entrapping, longitudinal slab cracking, etc. are liable to occur. Solidification in a mold by adding carbon to the surface layer, as in the present invention, is solidification of Fe-C alloy and thus the solid-liquid coexisting region can be sufficiently maintained, resulting in less occurrence of heterogenous state and consequent considerable decrease in the surface defects.

That is, in the present invention, the surface layer is made to contain 0.01–0.08% by mass of C and brought substantially into a cementite, whereby the surface layer can take a composition corresponding to that of low carbon, aluminum-killed steel during the solidification in the continuously casting mold, resulting in shaping of the solidified shell into a normal state, minimizing fine crackings on or segregation in the surface layer of continuously cast slab and reducing the source of surface defects. Then, the ordinary IF steel as near as pure iron is liable to seize on rolls, etc. during the hot rolling, whereas in the present extremely low carbon steel, the carbide as cementite in the slab dissolves and exists as solid solution carbon, and thus hot rolling flaws due to less presence of solid solution carbon never occur. The presence of solid solution carbon and the presence of cementite at a low temperature can give some satisfactory strength at high, medium and ordinary temperatures and generation of flaws when handled in the subsequent steps is also reduced to as low as that of ordinary low carbon, aluminum-killed steel.

Furthermore, the surface layer is made to have a composition corresponding to the low carbon, aluminum-killed steel, and thus the product characteristics can be largely improved. The surface layer of the conventional IF steel composition as near as pure iron has a low fatigue strength at any cost. The parts subjected to heat influences by welding, etc. undergo more severe deterioration. On the other hand, in the present extremely low carbon steel, the surface layer subject to fatigues or bending has a composition corresponding to that of ordinary low carbon, aluminum-killed steel, and thus the above-mentioned problems can be substantially solved.

Components for the inner layer and components for surface layer excluding carbon are selected to maintain the strength and processability as IF steel.

That is, the C content must be not more than 0.0050% by mass, preferably not more than 0.0030% by mass. Above 0.0050% by mass, satisfactory processability, particularly r value and elongation, are hard to obtain.

Si is a solid solution-strengthening element and not more than 1.5% by mass of Si is suitable in the case of high strength steel sheet. However, Si forms a stable oxide film at a low temperature and is liable to fail to undergo plating in the case of molten zinc plating which must be subjected to reduction during the annealing. From this point of view, it is desirable not to use Si, as much as possible. When used, Si should be limited to the impurity level of mild steel sheet, which is not more than 0.03% by mass. However, so long as some improvement in the reduction can be made, addition of Si is not objectionable.

Not more than 2.0% by mass of Mn, or 0.05–0.4% by mass of Mn in the case of mild steel sheet, can be contained.

Mn is also a solid solution—strengthening element and gives rather less deterioration of elongation and r value, though it can effect the strengthening. In the case of high strength steel sheet, 0.20–2.0% by mass of Mn must be contained from this point of view. Below 0.20% by mass, no substantially effective strengthening is)obtainable by Mn. Below 0.05% by mass, it is not sufficient to fix impurity S as MnS, and the surface layer is liable to embrittle, giving rise to surface defects during the hot rolling. In the case of mild steel sheet, 0.05–0.25% by mass of Mn must be contained.

The lower limit of Mn is so selected to fix impurity S as MnS. To be more stable, it is preferable that the inevitable impurity S be not more than 0.011% by mass, desirably not more than 0.010% by mass, and Mn/S be not less than 10.

P is also a solid solution-strengthening element and is used to intensify steel in the case of high strength steel sheet. However, P brings about grain boundary embrittlement and promotes deterioration of secondary workability, as will be described later, and thus not more than 0.15% by mass of P, desirably not more than 0.08% by mass of P must be contained. In the case of mild steel sheet, P is not required, and desirably not more than 0.02% by mass must be contained.

Al is used as a deoxidizer and contained as residues in steel. Below 0.01% by mass of Al, no satisfactory deoxidation can be obtained, and steel inclusions are increased and appear as surface defects or deteriorate the steel quality. Above 0.10% by mass of Al, on the other hand, the steel purity is deteriorated resulting also in appearance of surface defects and internal defects.

Not more than 0.0050% by mass of N must be contained. Above 0.0050% by mass of N, presence of fine nitrides such as AlN, etc. gives some influence upon the steel recrystallization behavior, resulting in deterioration of steel quality.

The inner layer must contain at least one of 0.02–0.10% by mass, desirably 0.02–0.08% mass, of Ti; 0.01–0.10% by mass, desirably 0.01–0.08% by mass, of Nb; 0.02–0.10% by mass of V; and 0.03–0.10% by mass of Zr to fix solid solution carbon. Below the respective lower limit values, no satisfactory carbon fixation can be obtained and the inner layer can have no such characteristics as those of IF steel. In that case, the amount of Ti, Nb, etc. to be added is not a stoichiometrically equivalent to carbon, but must be a little more than the equivalent to carbon in view of the rate, that is, kinetics of carbide precipitation. At their respective upper limit values, their effect is substantially saturated, and thus above their respective upper limit values, economy is deteriorated. These contents depend on the carbon content and conditions in the successive steps. It is preferable as a combination from the viewpoint of steel quality to select not more than 0.0025% by mass of carbon, and 0.025–0.040% by mass of Ti as a carbide-forming element, and restrict the heating temperature for the hot rolling to not more than 1,100° C. When 0.01–0.02% by mass of Nb is contained, if any, under these conditions, a further improvement in the steel quality can be expected.

In the case of sheet steels, embrittlement due to secondary working takes place. That is, breakage of shaped wall parts due to embrittlement or characteristic defects called "planer cracking" sometimes occurs when secondary working such as size enlargement, etc. is carried out after the deep drawing operation. The breakage seems to be due to deterioration of grain boundary strength of IF steel, and can be overcome by adding 0.0001–0.0015% by mass, desirably 0.0001–0.0010% by mass, of B, when required. B seems to minimize deterioration of steel quality and increase the grain boundary strength. Below the lower limit value, no effective improvement of secondary workability is obtained. Above the upper limit value, deteriotation of steel quality becomes large. Preferably, not more than 0.0008% by mass of B must be contained.

The foregoing description concerns he outline of the present steel slab.

To obtain a steel slab having the above-mentioned composition, steel is made in a converter, and then steel containing not more than 0.0050% by mass of C, not more than 1.5% by mass of Si, not more than 2.0% by mass of Mn, not more than 0.15% by mass of P, 0.01–0.15% by mass of Al and not more than 0.0050% by mass of N, the balance being Fe and inevitable impurities, is made in a vacuum degassing apparatus, or the like and then subjected to continuous casting. The surface layer is made from low C-Al-killed steel and have good mechanical properties. The final product can contain a surface layer having some thickness.

When at least one of Ti and Nb is added to the surface layer on the other hand, precipitates such as TiC are formed in the surface layer, making the steel rigid. That is, the surface layer can be utilized for improving the mechanical properties and protecting the steel from defects in the successive steps. In that case, it is preferable that the final product has no remaining surface layer. On the other hand, when there is the remaining surface layer, the mechanical properties are deteriorated in proportion to the presence of remaining surface layer. In the final product, the surface layer must have as small a thickness as nearly none, that is, such a thickness as to be scaled off. Addition of C to the surface layer and addition of at least one of Ti, Nb, V and Zr to the inner layer are carried out in the continuous casting, as shown in FIG. 1. That is, an electromagnetic brake 2 is provided at a mold 1 of continuously casting apparatus, and a direct current magnetic field crossing the thickness of slab 6 is applied at a lower level position in the casting direction than the meniscus of molten steel poured into the continuously casting apparatus 1 from a ladle 3 through a tundish 4 and an immersion nozzle 5, to the molten steel, thereby forming a direct current magnetic field zone. C-containing powder 8 is supplied to the upper surface of upper molten steel pool 7 separated by the direct current magnetic field zone to add C to the surface layer 9 of slab 6. Furthermore, Fe-coated alloy wire containing at least one of Ti, Nb, V and Zr is inserted into lower molten steel pool 10 by a wire feeder 11 to add at least one of Ti, N , V and Zr to the inner layer 12 of slab 6. By carrying out the continuous casting in this manner, the surface layer and the inner layer are separated from each other by the effect of electromagnetic brake to obtain a slab having a desired composition. The alloy to be supplied from the wire is so adjusted in the iron thickness coated on the wire, feed rate, etc. as to enter the lower pool in the mold. A single wire or a plurality of wires can be used. The wire can contain only Ti, Nb, V or Zr, or a mixture thereof.

The powder must contain 0.5–10% by mass or 0.5–5% by mass, of C, and has a composition comprising, for example, 29% by mass of $SiO_2$, 7% by mass of $Al_2O_3$, 30% by mass of CaO, 13% by mass of $Na_2O$, 7% by mass of $F^-$ and 2.5% by mass of C.

Total thickness of the surface layer on both sides in the slab is 5–15% of the thickness of the inner layer. Below 5%, no surface layer effect is hard to obtain, whereas, above 15%, no high processability of inner layer can be obtained throughout. 5–10% or 5–9.0% is preferable. Control of thickness of the surface layer and the inner layer can be carried out fully according to the already mentioned method. Continuously casting of slab can be carried out by a process of any type including a vertically bent type, a horizontally bent type, etc. Continuous casting of even a thin steel sheet having a thickness of about 50 mm is not objectionable.

When hot scarfing or cold scarfing is applied to the resulting slab, thickness of high-carbon surface layer should be controlled in veiw of a scarfing allowance.

In the present invention, the source for the surface defects is reduced by producing a surface layer having a higher carbon content in this manner.

Hot rolling defects are hard to occur during the hot rolling, because the present slab composition contains ordinary carbon, the present slab is different from soft extremely low carbon steel that is liable to undergo seizure on rolls, etc. Different from extremely low carbon steel, the present slab has a satisfactory strength at high-middle-ordinary temperatures, and it is expectable that generation of handling flaws in the subsequent steps can be largely reduced.

Then, the steel slab is hot rolled. Hot rolling is carried out by heating, rough rolling, finish rolling, cooling at a run-out talbe, etc., followed by coiling. It is not objectionable that the hot rolling is carried out by direct hot rolling (DR) without passing through a heating furnace or by a hot slab insertion method (HCR) based on insertion of a hot slab into a heating furnace. In the case of passing through a heating furnace, a conventional heating temperature, such as 1,050°–1,200° C., can be used. The carbon-added region of the surface layer can be mostly scaled off during the heating process. Thus, the original thickness can be retained, as it is, down to the final step, giving no adverse influence upon the steel quality. However, excessive scaling-off reduces the effect of preventing surface defects, and thus it is preferable that heating is carried out at a temperature of not more than 1,150° C. for a furnace residence the of not more than 120 min. Heating at a lower temperature than 1,100° C. is preferable, because the steel properties can be further improved.

Hot rolling can be carried out by any type, for example, a full continuous type, semi-continuous type, or their intermediate type. Finish rolling end temperature must be usually above the $Ar_3$ transformation point, but the rolling can be carried out below the $Ar_3$ transformation point within such a range that no ridging-like skin roughening takes place. Coiling temperature plays an important role in the steel properties. The higher the coiling temperature, the better the improvement. In this sense, it is desirable that the coiling temperature be not less than 680° C.

However, coiling at a higher temperature is liable to form defects of pickling origin, and front and tail ends of coil are quenched, resulting in deterioration of steel properties at these porsions and heterogeneous steel properties. Thus, it is preferable that coiling temperature be 550°–690° C. After the coiling, the resulting coil is cooled and, when required, pickled, and made into a hot rolled steel sheet or a hot rolled coil through appropriate finishing treatments and delivered to the market.

Pickled, hot rolled coil is cooled and then subjected to recrystallization annealing to make a cold rolled coil. Cold rolling reduction ratio can be in a range of 60°–85° C., as usual. Recrystallization annealing is carried out by box annealing or continuous annealing. Annealing conditions are 650°–750° C. for 1–20 hours for thee box annealing and 700°–900° C. for 10 seconds–10 minutes for the continuous annealing. Any type can be used for the box annealing and continuous annealing. Cold rolled coil can be served as a cold rolled steel sheet product directly, or passed through an electrogalvanizing line to make an electrogalvanized steel sheet. For the electrogalvanizing, not only ordinary pure zinc plating, but also alloyed galvanizing of Zn—Ni, etc. containing zinc as the main component can be used.

Cold rolled coil can be passed through a continuous hot dip galvanizing line to make a hot dip galvanized steel sheet. In that case, heating conditions are the same as those for the continuous annealing.

For the hot dip galvanizing, so called galvannealing, where after dipping in a zinc pot and reheating to 500° C., the resulting plating layer is converted to an iron-zinc alloyed phase, can be used. In that case, zinc adhesion and alloying state (in case of galvannealing) are influenced by steel components, but the surface layer-improving effect of the present invention can give a good influence upon the zinc platability (adhesion and alloying state).

That is, in the case of hot dip galvanizing steel sheets, the zinc adhesion is influenced by steel components, and in the case of galvannealing, the alloying state is influenced thereby, and thus it is necessary for the conventional IF steel, particularly IF-based high strength steel sheet to take such steps as selection of special component system. In the present invention, on the other hand, any special steps are not required. Rather, it is not necessary to select steel species such as hot rolled steel sheets, cold rolled steel sheet and electrogalvanized steel sheet, and this is one of remarkable effects of the present invention. Hot dip galvanized steel sheets or galvannealed steel sheets have very good zinc adhesion and alloying behavior of Zn and Fe even without taking any special steps. Thickness of surface layer in the product is decreased due to scale formation and its releasing during the hot rolling and total thickness thereof on both sides is 2–8% of that of the inner layer.

When the surface layer further contains at least one of Ti and Nb, mechanical properties of final product will be deteriorated in proportion to the presence of remaining surface layer, and thus it is better that no surface layer remains in the final product. That is, the thickness must be not more than 8%.

MODE FOR CARRING OUT THE INVENTION

Examples are given below:

EXAMPLE 1

Figure 1:
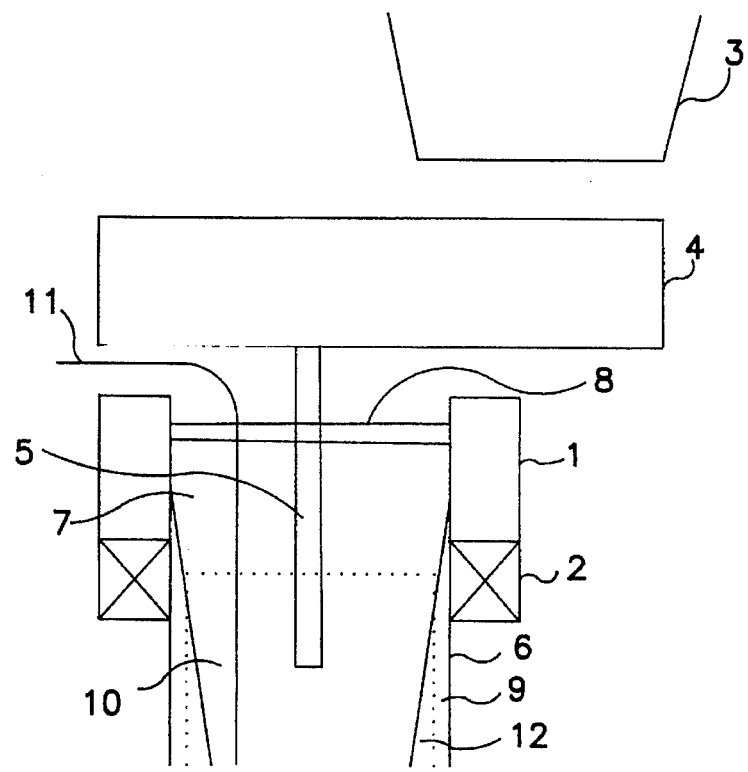
FIG. 1 is a schematic view of a continuously casting apparatus provided with an electromagnetic brake and a wire feeder used in Examples.

Steel containing 0.0025% by mass of C, 1.21% by mass of Mn, 0.044% by mass of P, 0.033% by mass of Al, 0.0016% by mass of N and 0.0006% by mass of B was made by melting through a converter step and an RH vacuum degassing step and then subjected to continuous casting. A continuous casting apparatus was provided with an electromagnetic brake 2 and a wire feeder 11 for alloy addition at a mold 1, as shown in FIG. 1. Wire was coated with iron and so made as to add an alloy to a lower molten steel pool 10 depending on the coating thickness and feeding rate. The alloy was a mixture of Ti and Nb. Powder 8 containing 30% by mass of $SiO_2$, 7.5% by mass of $Al_2O_3$, 30% by mass of CaO, 12% by mass of $Na_2O$, 6.5% by mass of $F^-$ and 2.5% by mass of C as main components was used. Electromagnetic force of the electromagnetic brake was set to 0.5T. Slab withdrawing rate was 1.5 m/min.

In this manner, the C content of surface layer 9 was made 0.022% by mass, and the Ti content of the inner layer 12 and the Nb content of the inner layer were made 0.041% by mass and 0.018% by mass, respectively. Component analysis was carried out by chemical analysis of a sample for the surface layer, taken from the site at a 3 mm-deep position of slab surface layer freed from the scale layer, and a sample for the inner layer, taken from the site in the vicinity of a ¼ thickness position.

A slab having sizes of 280 mm thick, 1,600 mm wide and 11,500 mm long was obtained.

Figure 2:
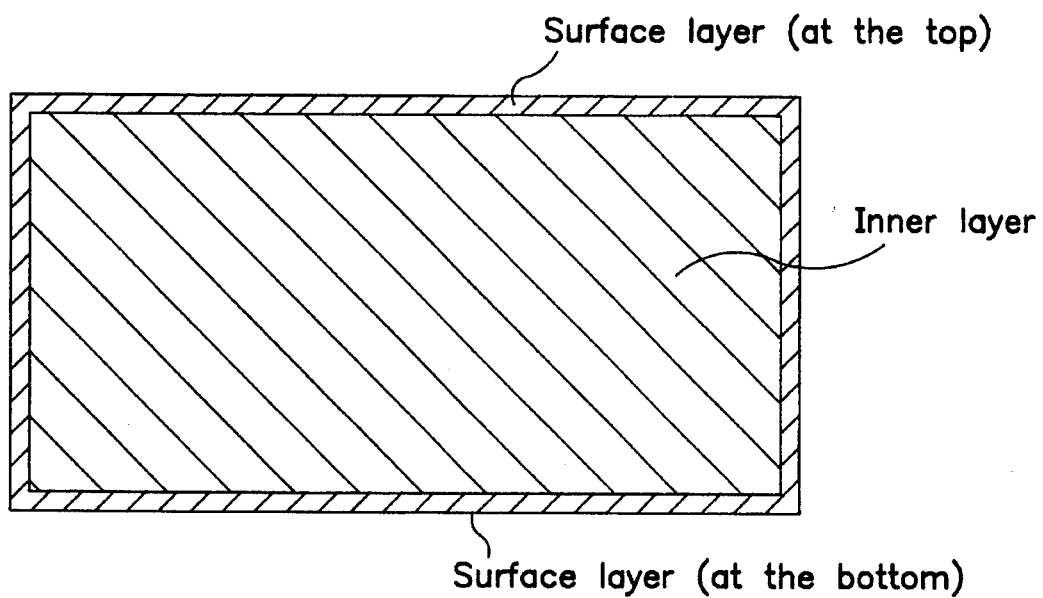
FIG. 2 is a schematic cross-sectional view showing a slab according to the present invention.

As shown in FIG. 2, a portion of the slab was sampled to observe the cross-section. It was found that among the total thickness of 280 mm, the surface layer (at the top) was 8.9–10.1 mm thick and the one (at the bottom) was 9.5–10.8 mm thick. Thickness of the surface layer was 6.7–7.4% of total thickness. That is, total thickness of surface layer on both sides was 7.2–8.0% of that of the inner layer.

Figure 3:
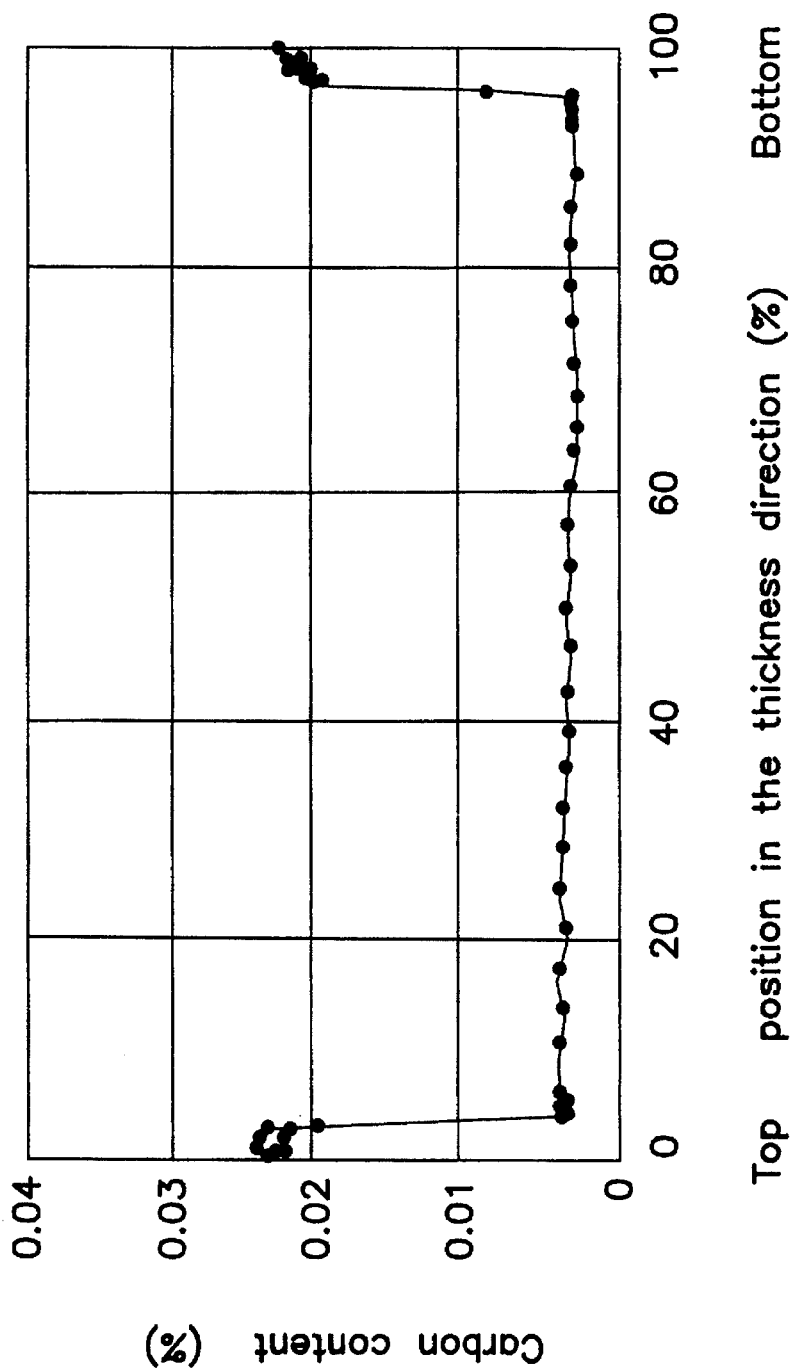
FIG. 3 is a diagram showing distribution of C component in the thickness direction of ¼ width region of a slab according to Examples.

One of the slabs having a difference in the components thus obtained was sampled and investigated for component distribution at the cross-section, etc. As shown in FIG. 3 the carbon content was distributed in a range of 0.02–0.024% by mass in the slab surface layer region and in a range of 0.0023–0.0028% by mass in the inner layer range. On the other hand, neither Ti nor Nb was detected in the surface layer region, whereas Ti and Nb were stably distributed at 0.041% by mass and 0.018% by mass as averages, respectively. It was found from results of optical microscope observation and a scanning electron microscope elemental analysis that carbides in the surface layer region were in the form of cementite. As to the inner layer region, many fine grains, from which Ti and Nb were detected and Fe, Mn, S, etc. are not detected by elemental analysis of precipitate extracts by a scanning electron microscope, were observed and determined to be carbides of Ti and Nb. No cementite was found in the inner layer region by an optical microscope observation.

The remaining slabs were then hot rolled at a heating temperature of 1,080°–1,150° C., a finish rolling end temperature of 880°–915° C. and a coiling temperature of 670°–690° C. Thickness of hot rolled steel sheets was made to 4.0 mm. After pickling, one of coils was selected, subjected to 1% skin-pass rolling and sampled to investigate steel quality and grade. To inspect the coil surface grade, the coil was passed through an inspection line at a low speed and uncoiled. Inspection was carried out on both the face and back sides.

The remaining pickled and hot rolled coils were cold rolled down to a thickness of 0.8 mm (cold rolling ratio: 80%). Five of cold rolled coils were subjected to continuous annealing and 6 thereof were passed through a continuous galvanizing line to make cold rolled steel sheets and hot dip galvanized steel sheets, respectively. Conditions for the continuous annealing were a temperature rise rate of 10° C./sec., soaking at 850° C. for 50 seconds, and 1.0% skin-pass rolling. The continuous galvanizing line consisted of a non-oxidizing heating furnace, a reducing furnace, a Zn pot, an alloying furnace, and a skin-pass roller and had the following conditions: temperature rise rate of 25° C./sec., a attainable maximum temperature of 860° C., a pot dipping temperature of 460° C.; the alloying conditions: 500° C. for 10 seconds; 1.0% skin-pass rolling; zinc deposit: 45 g/m² (per side).

All the coils were passed through the inspection line at a low speed to inspect both the face and back sides.

Surface flaw inspection results and steel quality test results are shown in Table 1, where first class as a surface grade is the standard for automobile outer casing sheets, which is destined to the most strict use.

galvanized steel sheets, whereas the present steel has that of 3% maximum at most. The rejected products included those of very fine defect origin, such as those only remarkable on the surfaces when plated, and complete elimination of rejected products from the conventional IF-based high strength steel seems to be substantially impossible. Plating characteristics of plated steel sheets are considerably improved, as apparent from Table 1. Furthermore, in spite of the fact the hot rolled steel sheets, cold rolled steel sheets, and hot dip galvanized steel sheets are all made from the same steel species, the improvements can be obtained, and this fact shows that steel species unification, etc. can be attained as very remarkable characteristics and effects.

TABLE 1

| Species | | No | Mechanical test results *1 | | | | Surface grade (First class) *2 | | Plating characteristics Powdering point marks *3 | |
|---|---|---|---|---|---|---|---|---|---|---|
| | | | Yield point strength N/mm² | Tensile strength N/mm² | Elongation % | r value | Face side during hot rolling | Back side during hot rolling | Average point marks | % of point marks ≧5 |
| Hot rolled steel sheet | Present steel | 1 | 254 | 370 | 42.1 | — | 0.0 | 0.0 | — | — |
| | Comp. steel | | 246 | 374 | 41.9 | — | 4.1 | 2.3 | — | — |
| Cold rolled steel sheet | Present steel | 1 | 225 | 372 | 42.3 | 2.05 | 0.2 | 1.2 | — | — |
| | Present steel | 2 | 228 | 369 | 43.3 | 1.97 | 0.7 | 1.5 | — | — |
| | Present steel | 3 | 223 | 373 | 41.8 | 2.16 | 2.2 | 0.0 | — | — |
| | Present steel | 4 | 228 | 367 | 42.5 | 1.94 | 3.0 | 0.9 | — | — |
| | Present steel | 5 | 223 | 375 | 43.5 | 2.15 | 0.0 | 0.0 | — | — |
| | Comp. steel | | 229 | 374 | 43.8 | 2.14 | 10.5 | 7.6 | — | — |
| Alloyed molten zinc plated steel sheet | Present steel | 1 | 224 | 368 | 38.6 | 1.75 | 1.9 | 0.6 | 2.4 | 0.0 |
| | Present steel | 2 | 221 | 373 | 38.6 | 1.80 | 0.0 | 0.0 | 2.3 | 0.9 |
| | Present steel | 3 | 221 | 373 | 38.9 | 1.71 | 1.7 | 1.6 | 2.7 | 0.3 |
| | Present steel | 4 | 222 | 373 | 40.7 | 1.81 | 2.1 | 1.8 | 2.6 | 0.0 |
| | Present steel | 5 | 223 | 372 | 39.1 | 1.84 | 2.8 | 0.1 | 2.6 | 0.5 |
| | Present steel | 6 | 222 | 369 | 39.0 | 1.70 | 0.7 | 0.3 | 1.0 | 0.8 |
| | Comp. steel | | 230 | 375 | 39.8 | 1.62 | 21.6 | 11.0 | 3.9 | 33.2 |

*1 Test pieces (JIS Z2201 No. 5) were tested according to JIS Z2241. Sampling was made at 5 sites in the coil longitudinal direction. Figures are averages thereof.
*2 Length of unsatisfactory part was measured and divided by total length (%).
*3 Powdering was evaluated in 10 point marks by Erichsen extrusion, peeling of plating layer by a Scotch tape and determination of weight loss (← 10 [better] 1 [poorer] →)
Marketing standard is less than 4 point marks (5–7 point marks are marketable by change of use). Sampling was made at 5 sites in the coil longitudinal direction. Figures are averages therof.

Comparative steel is an IF-based high strength steel made as the standard and contains 0.0017–0.0033% by mass of C, 0.01–0.03% by mass of Si, 1.1–1.3% by mass of Mn, 0.35–0.048% by mass of P, 0.015–0.025% by mass of Ti, 0.025–0.035% by mass of Nb, 0.031–0.040% by mass of Al, 0.0016–0.0029% by mass of N and 0.0002–0.0006% by mass of B and as close conditions for hot rolling, cold rolling and annealing as those for steel of the present Example were selected, and where averages of data of at least 50 coils are shown.

As show in Table 1 there are no substantial differences in the mechanical test results between the present steel and the comparative steel. That is, it was found that the present steel had very good steel quality that the IF-based high strength steel has.

As to the surface defects, it is apparent that the present steel has remarkable improvements on all of hot rolled steel sheets, cold rolled steel sheets and galvannealed steel sheets. The comparative IF-based high strength steel has a rejection ratio of a few % with the hot rolled steel sheets and that of over 10% with the cold rolled steel sheets and hot dip

EXAMPLE 2

Steel slabs having differences in the composition between the surface layer and the inner layer, as shown in Table 2, were prepared in the same manner as in Example 1. All of these are slabs of the present invention. Slab thickness was 280 mm and surface thickness was 6–8 mm on one side. Total thickness of the top surface layer and the bottom surface layer was 13.5–15.5 mm. A few slabs were properly selected at each charge and made into hot rolled steel sheets, cold rolled steel sheets and galvannealed steel sheets. Their process conditions and mechanical test results and surface grade of the steel sheets are shown in Tables 3 and 4. As is apparent from Tables 3 and 4, the individual steel sheets have good processabilities that the extremely low carbon IF steel has, as if mild steel has good workabilities that the mild steel has and as if high strength steel sheets have good workabilities that the high strength steel sheets have. It was found that the surface grade was very good (for the comparative ordinary steel, see Table 1 of Example 1).

TABLE 2

| Steel identification | Surface/Inner | C | Si | Mn | P | S | Al | N | Ti | Nb | V | Zr | mass % B |
|---|---|---|---|---|---|---|---|---|---|---|---|---|---|
| 2-1 | Surface layer | 0.025 | 0.010 | 0.18 | 0.011 | 0.005 | 0.031 | 0.0018 | <0.002 | <0.002 | <0.005 | <0.005 | <0.0001 |
|  | Inner layer | 0.0020 | 0.009 | 0.17 | 0.013 | 0.005 | 0.030 | 0.0016 | 0.038 | <0.002 | <0.005 | <0.005 | <0.0001 |
| 2-2 | Surface layer | 0.030 | 0.018 | 0.86 | 0.033 | 0.002 | 0.025 | 0.0014 | <0.002 | <0.002 | <0.005 | <0.005 | <0.0001 |
|  | Inner layer | 0.0021 | 0.020 | 0.86 | 0.035 | 0.002 | 0.022 | 0.0016 | 0.031 | 0.015 | <0.005 | <0.005 | <0.0001 |
| 2-3 | Surface layer | 0.017 | 0.021 | 0.31 | 0.073 | 0.002 | 0.036 | 0.0022 | <0.002 | <0.002 | <0.005 | <0.005 | 0.0008 |
|  | Inner layer | 0.0019 | 0.019 | 0.25 | 0.070 | 0.003 | 0.039 | 0.0023 | <0.002 | 0.046 | <0.005 | <0.005 | 0.0007 |
| 2-4 | Surface layer | 0.028 | 0.46 | 0.73 | 0.059 | 0.006 | 0.029 | 0.0018 | <0.002 | <0.002 | <0.005 | <0.005 | 0.0003 |
|  | Inner layer | 0.0021 | 0.46 | 0.75 | 0.061 | 0.007 | 0.025 | 0.0019 | 0.044 | <0.002 | 0.035 | <0.005 | 0.0002 |
| 2-5 | Surface layer | 0.020 | 0.80 | 1.57 | 0.092 | 0.011 | 0.025 | 0.0029 | <0.002 | <0.002 | <0.005 | <0.005 | 0.0011 |
|  | Inner layer | 0.0025 | 0.78 | 1.50 | 0.091 | 0.010 | 0.030 | 0.0029 | 0.028 | 0.031 | <0.005 | 0.020 | 0.0010 |
| 2-6 | Surface layer | 0.026 | 0.010 | 0.15 | 0.009 | 0.001 | 0.041 | 0.0011 | <0.002 | <0.002 | <0.005 | <0.005 | 0.0003 |
|  | Inner layer | 0.0022 | 0.010 | 0.14 | 0.009 | 0.002 | 0.038 | 0.0010 | <0.002 | 0.045 | 0.030 | <0.005 | 0.0004 |
| 2-7 | Surface layer | 0.030 | 0.37 | 1.54 | 0.020 | 0.002 | 0.040 | 0.0015 | <0.002 | <0.002 | <0.005 | <0.005 | <0.0001 |
|  | Inner layer | 0.0020 | 0.38 | 1.56 | 0.021 | 0.003 | 0.042 | 0.0015 | 0.046 | <0.002 | <0.005 | <0.005 | <0.0001 |
| 2-8 | Surface layer | 0.032 | 0.025 | 0.69 | 0.047 | 0.002 | 0.033 | 0.0025 | <0.002 | <0.002 | <0.005 | <0.005 | 0.0006 |
|  | Inner layer | 0.0018 | 0.023 | 0.69 | 0.045 | 0.002 | 0.033 | 0.0022 | 0.035 | 0.020 | <0.005 | <0.005 | 0.0006 |
| 2-9 | Surface layer | 0.016 | 0.023 | 1.35 | 0.069 | 0.008 | 0.035 | 0.0018 | <0.002 | <0.002 | <0.005 | <0.005 | 0.0008 |
|  | Inner layer | 0.0019 | 0.023 | 1.34 | 0.070 | 0.008 | 0.032 | 0.0019 | <0.002 | <0.002 | 0.046 | 0.041 | 0.0008 |

TABLE 3

| | | Hot rolling conditions (Average) | | | | Cold rolling conditions | | Annealing conditions *1 | |
|---|---|---|---|---|---|---|---|---|---|
| Final steel sheet | | Heating temperature °C. | Finish rolling end temperature °C. | Coiling temperature °C. | Thickness of hot rolled sheet mm | Thickness of cold rolled sheet mm | Cold rolling ratio % | Annealing temperature °C. | Time *2 S |
| Hot rolled steel sheet | 2-1 | 1090 | 915 | 660 | 4.0 | — | — | — | — |
|  | 2-2 | 1090 | 910 | 670 | 4.0 | — | — | — | — |
|  | 2-3 | 1090 | 930 | 650 | 3.2 | — | — | — | — |
|  | 2-4 | 1130 | 930 | 660 | 3.5 | — | — | — | — |
|  | 2-6 | 1050 | 910 | 660 | 5.0 | — | — | — | — |
|  | 2-8 | 1130 | 915 | 630 | 4.0 | — | — | — | — |
| Cold rolled steel sheet | 2-2 | 1090 | 910 | 670 | 4.0 | 0.8 | 80.0 | 850 | 60 |
|  | 2-3 | 1090 | 930 | 650 | 3.2 | 0.8 | 75.0 | 820 | 50 |
|  | 2-5 | 1150 | 890 | 660 | 4.0 | 0.9 | 74.3 | 850 | 60 |
|  | 2-6 | 1050 | 910 | 660 | 5.0 | 1.2 | 76.0 | 850 | 60 |
|  | 2-7 | 1100 | 880 | 670 | 4.0 | 0.8 | 80.0 | 850 | 60 |
|  | 2-8 | 1130 | 915 | 630 | 4.0 | 0.8 | 80.0 | 800 | 60 |
|  | 2-9 | 1100 | 920 | 685 | 4.0 | 0.8 | 80.0 | 850 | 60 |
| Galvannealed steel sheet | 2-1 | 1090 | 915 | 660 | 4.0 | 0.8 | 75.0 | 850 | 60 |
|  | 2-2 | 1090 | 910 | 670 | 4.0 | 0.8 | 80.0 | 800 | 50 |
|  | 2-3 | 1090 | 930 | 650 | 3.2 | 0.8 | 84.0 | 820 | 50 |
|  | 2-4 | 1130 | 930 | 660 | 3.5 | 0.8 | 80.0 | 850 | 60 |
|  | 2-5 | 1150 | 890 | 660 | 4.0 | 0.9 | 77.5 | 870 | 60 |
|  | 2-6 | 1050 | 910 | 660 | 5.0 | 1.2 | 70.0 | 830 | 50 |
|  | 2-7 | 1100 | 880 | 670 | 4.0 | 0.8 | 80.0 | 860 | 60 |
|  | 2-8 | 1130 | 915 | 630 | 4.0 | 0.8 | 75.0 | 830 | 50 |

TABLE 4

| | | Mechanical properties *3 (Average) | | | | Surface quality *2 (First grade) | | Plating characteristics |
|---|---|---|---|---|---|---|---|---|
| | | Yield | | | | (First grade) *4 | | *5 |
| Final steel sheet | | point strength N/mm² | Tensile strength N/mm² | Elongation % | r Value | Hot rolled sheet point marks | Product | Powdering point marks |
| Hot rolled steel sheet | 2-1 | 197 | 325 | 51.5 | — | 0.7 | — | — |
| | 2-2 | 240 | 379 | 41.0 | — | 0.0 | — | — |
| | 2-3 | 220 | 345 | 44.2 | — | 0.0 | — | — |
| | 2-4 | 242 | 373 | 42.1 | — | 0.0 | — | — |
| | 2-6 | 184 | 319 | 51.6 | — | 0.8 | — | — |
| | 2-8 | 205 | 350 | 43.2 | — | 0.5 | — | — |
| Cold rolled steel sheet | 2-2 | 235 | 372 | 41.3 | 2.05 | 0.1 | 1.8 | — |
| | 2-3 | 198 | 344 | 42.8 | 2.15 | 0.4 | 1.2 | — |
| | 2-5 | 248 | 408 | 38.1 | 1.79 | 0.7 | 1.0 | — |
| | 2-6 | 155 | 292 | 56.2 | 2.52 | 0.0 | 0.0 | — |
| | 2-7 | 237 | 373 | 43.6 | 1.98 | 1.2 | 1.3 | — |
| | 2-8 | 208 | 355 | 41.9 | 2.00 | 0.5 | 0.4 | — |
| | 2-9 | 257 | 396 | 40.0 | 1.96 | 0.1 | 0.3 | — |
| Galvannealed steel sheet | 2-1 | 164 | 301 | 48.6 | 1.89 | 2.3 | 0.7 | 2.0 |
| | 2-2 | 235 | 372 | 38.0 | 1.76 | 1.9 | 1.6 | 1.6 |
| | 2-3 | 201 | 349 | 39.5 | 1.88 | 2.3 | 1.6 | 2.1 |
| | 2-4 | 240 | 370 | 38.2 | 1.77 | 1.7 | 2.2 | 1.2 |
| | 2-5 | 250 | 413 | 34.8 | 1.51 | 1.4 | 0.1 | 1.2 |
| | 2-6 | 160 | 292 | 53.5 | 2.25 | 0.4 | 1.4 | 1.8 |
| | 2-7 | 240 | 375 | 40.7 | 1.67 | 1.4 | 0.7 | 2.3 |
| | 2-8 | 210 | 355 | 38.7 | 1.72 | 0.3 | 2.8 | 2.2 |

In Tables 3 and 4, *1–*5 have the following meanings:
*1 Soaking conditions for continuous annealing in the case of cold rolled steel sheets; and conditions for the reduction furnace in the case of hot dip galvanized steel sheets.
*2 Soaking time in the case of cold rolled steel sheets; and residence time in the reduction furnace in the case of hot dip galvanized steel sheets.
*3 Test pieces (JIS Z2201 No. 5) were tested according to JIS Z2241.
*4 Length of unsatisfactory part was measured and divided by total length (%). Average of face and back sides.
*5 Powdering was evaluated in 10 point marks by Erichsen extrusion, peeling of plating layer by a Scotch tape and determination of weight loss (← 1 [better] 10 [poorer] →).
Marketing standard is less than 4 point marks (5–7 point marks are marketable by change of use).
Sampling was made at 5 sites in the coil longitudinal direction, and figures are averages therof.

EXAMPLE 3

Figure 4:
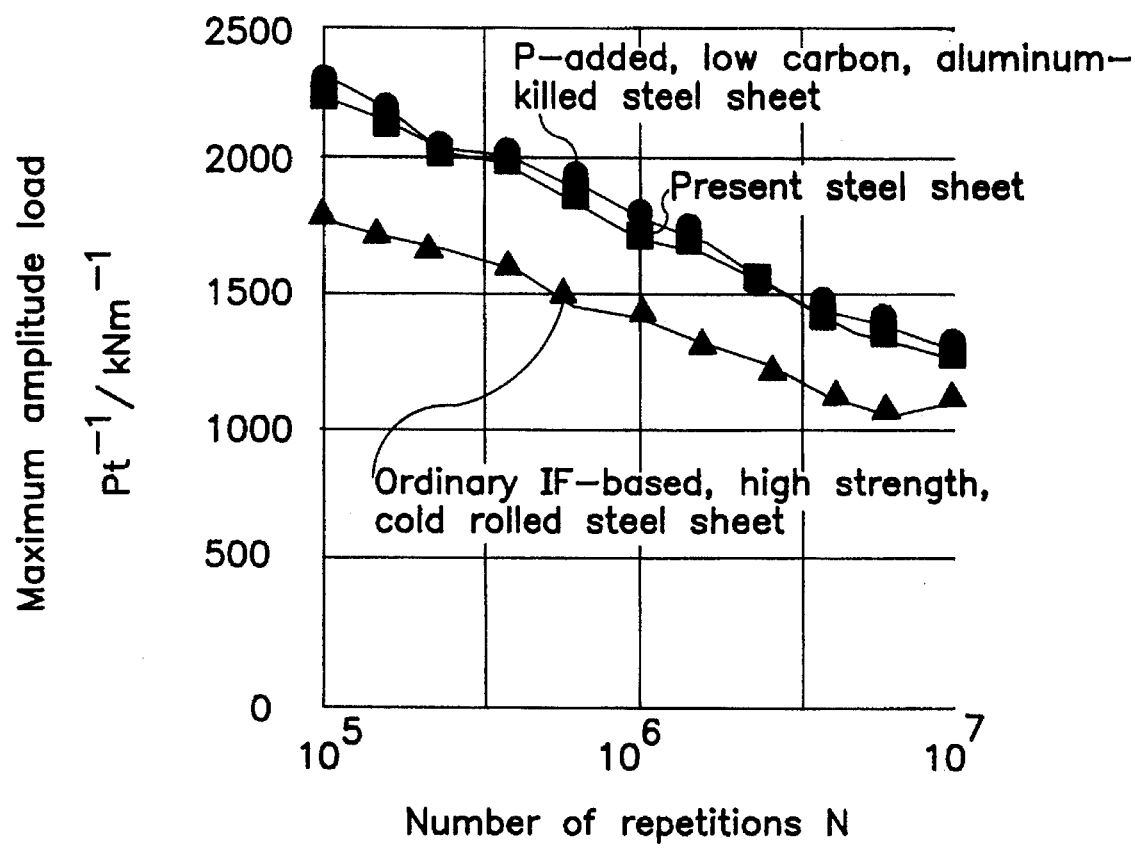
FIG. 4 is an S-N diagram showing fatigue test results at spot-welded joint.

Problem of IF-based high strength steel as characteristics of the steel product, i.e. fatigue strength at the welded parts, was investigated. Test pieces were selected from cold rolled steel sheet No. 2 of the present invention in Table 1 of Example 1. As comparative examples, ordinary IF-based high strength cold rolled steel sheets, which have substantially equal quality up to the surface layer to the quality of inner layer of the present steel, and P-added, low carbon, aluminum-killed, cold rolled steel sheets were used. Welding conditions were the standard ones, where welding was carried out under maximum current conditions without scattering at a nugget size of 3.6 mm. Fatigue test was carried out in an uniaxial mode of oil-hydraulic servo type. In FIG. 4, relationship between the maximum amplitude load (divided by sheet thickness) and the number of repetitions is shown. As is apparent from FIG. 4, the present steel sheets had a fatigue limit strength and a time strength substantially as high as those of P-added, low carbon, aluminum-killed steel sheets, whereas those of the comparative IF-based, high strength cold rolled steel sheets were rather 10–20% as low.

EXAMPLE 4

4 kinds of steel shown in Table 5 were made by melting in converter—RH vacuum degassing step and then subjected to continuous casting. Continuously casting apparatus was provided with an electromagnetic brake 2 at the lower part of mold 1, as shown in FIG. 1. Powder containing 29% by mass of $SiO_2$, 7% by mass of $Al_2O_3$, 3% by mass of CaO, 13% by mass of $Na_2O$, 7% by mass of $F^-$ and 2.5% by mass of C as main components was used. Electomagnetic force of electromagnetic brake was 1.5. Slab withdrawing rate was 1.9 m/min and slab thickness was 280 mm.

In this manner, the C content of the surface layer was made to be 0.026–0.030% by mass. A portion of the slabs was sampled and subjected to cross-sectional observation. It was found that, among the total thickness of 280 mm, the surface layer (at the top) was 6.3–7.7 mm thick and the surface (at the bottom) was 6.6–7.4 mm thick (the thickness range means fluctuations in the slab thickness direction).

The thus prepared slabs were hot rolled at a heating temperature of 1,080°–1,170° C., a finish rolling end temperature of 890°–926° C. and a coiling temperature of 650°–700° C. without scarfing of the surface layer. The hot rolled sheets were made to be 4.0 mm thick. After pickling, two coils were subjected to skin-pass rolling and sampled to inspect steel quality and grade. To investigate the coil surface grade, the coils were passed through an inspection line at a low speed and recoiled. Inspection was made on both the face and back sides.

The remaining pickled, hot rolled coils were cold rolled to 0.8 mm thick (cold rolling ratio: 80%). 8 coils properly selected from the cold rolled coils were subjected to continuous annealing. Other 9 coils were passed through a continuous hot dip galvanizing line. Continuous annealing conditions were a temperature rise rate of 10° C./sec., soaking at 850° C. for 50 sec., and skin-pass rolling of 0.8%. Continuous hot dip galvanizing line consisted of non-oxidizing heating furnace—reduction furnace—Zn pot—alloying furnace—skin-pass roller. Temperature rise rate was 25° C./sec., attainable maximum temperature 850° C., pot dip temperature 260° C., alloy conditions 500° C. for 10 sec., skin-pass rolling 0.8% and zinc deposite 45 g/m².

All of the coils were passed through the inspection line at a low speed and inspected in detail for both the face and back sides.

Results of surface flaw inspection and quality tests are shown in Table 6, where the first class is the standard for automobile outer casing, the most strick use.

Comparative steel was standard IF steel containing 0.0018–0.0031% by mass of C, 0.12–0.18% by mass of Mn, 0.029–0.036% by mass of Al, 0.0018–0.0029% by mass of N, and 0.0002–0.0006% by mass of B. Conditions for hot rolling, cold rolling and annealing were selected as near as possible to those of the steel of Example of the present invention. Figures are averages of data of at least 50 coils.

TABLE 5

Bulk components of steel of Example according to the invention (mass %)

| | C | Mn | P | Al | Ti | Nb | B |
|---|---|---|---|---|---|---|---|
| Steel A | 0.0022 | 0.20 | 0.016 | 0.032 | 0.047 | — | 0.0003 |
| Steel B | 0.0018 | 0.20 | 0.009 | 0.027 | 0.035 | 0.013 | — |
| Steel C | 0.0024 | 0.22 | 0.020 | 0.036 | — | 0.051 | 0.0005 |
| Steel D | 0.0019 | 0.17 | 0.073 | 0.031 | 0.039 | 0.016 | 0.0007 |

As shown in Table 6, there are no substantial differences or a slight decrease in the mechanical test results between the present steel and the comparative one, and the present steel has very good steel quality that IF steel has. It seems that a slight, decrease in the mechanical test results of the present steel is due to the carbon added to the surface layer. Optical microscope observation shows that the surface layer as deep as about 20 μm from the surface is a carbon-containing region.

As to the surface flaws, it is evident that the present steel of hot rolled steel sheets, cold rolled steel sheets and galvannealed steel sheets had remarkable improvements. In the case of the comparative IF steel, the hot rolled steel sheets had a rejection ratio of a few % and the cold rolled steel sheets and galvanized steel sheets had indeed a rejection ratio of over 10%, whereas the rejection ratio of the present steel was 2% to the maximum. Among the rejected products, a rejection of very slight defect origin such as defects only remarkable when plated is included, and in the case of the conventional IF steel, complete solution of rejection was found to be nearly impossible.

Surface defects of the present cold rolled steel sheets and galvanized steel sheets were handling defects in the successive steps and can be largely decreased by improvements of operating conditions. Up to now, there have been surface defect problems peculiar to the IF steel, and attempts so far made to improve the operating conditions have not overcome the peculiar problems. Thus, no satisfactory steps have been taken Yet. However, these defects have been overcome by the present invention and effective operational steps can be now taken with ease. It is expected that the rejection ratio can be largely reduced.

INDUSTRIAL APPLICABILITY

In the present invention, defects of thin IF-based steel sheets have been overcome and economy has been estab-

TABLE 6

| Species | | No. | Mechanical test results *1 | | | | Surface grade *2 (First class) | |
|---|---|---|---|---|---|---|---|---|
| | | | Yield point strength N/mm² | Tensile strength N/mm² | Elongation % | r value | Face side when hot rolled | Back side when hot rolled |
| Hot rolled steel sheet | Present Steel A | 1 | 201 | 323 | 50.1 | — | 0.0 | 0.1 |
| | Present Steel B | 2 | 205 | 330 | 48.7 | — | 0.0 | 0.0 |
| | Comp. Steel | | 199 | 312 | 50.2 | — | 2.3 | 1.9 |
| Cold rolled steel sheet | Present Steel A | 1 | 158 | 302 | 50.4 | 2.33 | 1.8 | 0.8 |
| | Present Steel A | 2 | 157 | 300 | 50.1 | 2.23 | 0.4 | 1.7 |
| | Present Steel A | 3 | 153 | 310 | 51.6 | 2.21 | 0.0 | 0.0 |
| | Present Steel B | 4 | 157 | 309 | 50.5 | 2.21 | 1.3 | 0.6 |
| | Present Steel B | 5 | 151 | 303 | 49.8 | 2.20 | 1.7 | 0.0 |
| | Present Steel C | 6 | 157 | 305 | 50.3 | 2.21 | 1.8 | 1.0 |
| | Present Steel C | 7 | 160 | 306 | 49.7 | 2.32 | 1.0 | 0.7 |
| | Present Steel D | 8 | 201 | 356 | 42.6 | 2.08 | 0.4 | 0.2 |
| | Comp. Steel | | 150 | 295 | 52.5 | 2.36 | 10.5 | 7.6 |
| Galvannealed steel sheet | Present Steel A | 1 | 166 | 312 | 48.4 | 2.02 | 1.8 | 7.6 |
| | Present Steel A | 2 | 171 | 316 | 48.9 | 2.09 | 0.1 | 1.6 |
| | Present Steel B | 3 | 170 | 311 | 48.6 | 2.09 | 0.5 | 1.8 |
| | Present Steel C | 4 | 174 | 325 | 48.4 | 2.04 | 2.2 | 0.9 |
| | Present Steel C | 5 | 169 | 317 | 47.9 | 2.14 | 3.7 | 1.3 |
| | Present Steel C | 6 | 172 | 315 | 48.7 | 2.05 | 1.4 | 4.0 |
| | Present Steel D | 7 | 200 | 348 | 41.8 | 1.90 | 0.2 | 0.2 |
| | Present Steel D | 8 | 199 | 349 | 39.9 | 1.86 | 1.5 | 0.2 |
| | Present Steel D | 9 | 200 | 346 | 39.6 | 1.95 | 1.1 | 0.4 |
| | Comp. Steel | | 168 | 314 | 47.7 | 2.19 | 17.3 | 9.6 |

In Table 6, symbols *1 and *2 have the following meanings:
*1 Test pieces (JIS Z2201 No. 5) were tested according to JIS Z2241. Sampling was made at 5 sites in the coil longitudinal direction. Figures are averages thereof.
*2 Length of unsatisfactory part was measured and divided by total length (%).

lished at the production. Product properties are on a completely equivalent level to those of low carbon, aluminum-killed, cold rolled steel sheets by historically renown box annealing or to low carbon, aluminum-killed, high strength, cold rolled steel sheets of 340–390 N·mm$^{-2}$ class. Thus, the present invention can provide material with a wide range of applicability in including automobile application as the main use.

We claim:

1. A continuously cast slab of extremely low carbon steel with less surface defects in a hot rolling, cold rolling, annealing or surface treatment step, which comprises a cast slab containing not more than 1.5% by mass of Si, not more than 2.0% by mass of Mn, not more than 0.15% by mass of P, 0.01–0.15% by mass of Al and not more than 0.005% by mass of N, and a surface layer of said cast slab further containing 0.01–0.08% by mass of C existing as a cementite, and an inner layer of said cast slab further containing not more than 0.0050% by mass of C and at least one of 0.02–0.10% by mass of Ti, 0.01–0.10% by mass of Nb, 0.02–0.10% by mass of V and 0.03–0.10% by mass of Zr, the carbon being present substantially as carbides of the said elements, and the balance being Fe and inevitable impurities.

2. A continuously cast slab of extremely low carbon steel with less surface defects in a hot rolling, cold rolling, annealing or surface treatment step, as described in claim 1, where the surface layer and the inner layer each further contain 0.0001–0.0015% by mass of B.

3. A continuously cast slab of extremely low carbon steel, as described in claim 1, wherein the surface layer contains 0.01–0.08% by mass of C as cementite, 0.1–0.4% by mass of Mn, not more than 0.08% by mass of P and 0.01–0.10% by mass of Al, and optionally further contains at least one of 0.01–0.08% by mass of Ti and 0.01–0.08% by mass of Nb, the balance being Fe and inevitable impurities, and the inner layer contains not more than 0.0050% by mass of C, 0.1–0.4% by mass of Mn, not more than 0.08% by mass of P and 0.01–0.10% by mass of Al, and further contains at least one of 0.02–0.08% by mass of Ti and 0.01–0.08% by mass of Nb, the balance being Fe and inevitable impurities.

4. A continuously cast slab of extremely low carbon steel, as described in claim 3, wherein the surface layer and the inner layer each further contain 0.0001–0.0010% by mass of B.

5. A continuously cast slab of extremely low carbon steel as described in any one of claims 1–4, wherein total thickness of the surface layer on both sides of the slab is 5–15% of that of the inner layer.

6. A continuously cast slab of extremely low carbon steel as described in claim 5, wherein total thickness of the surface layer on both sides of the slab is 5.0–9.0% of that of the inner layer.

7. An extremely low carbon sheet steel with less surface defects in steel sheet-producing step, which comprises a sheet steel containing not more than 1.5% by mass of Si, not more than 2.0% by mass of Mn, not more than 0.15% by mass of P, 0.01–0.15% by mass of Al and not more than 0.0050% by mass of N, and a surface layer of said sheet steel further containing 0.01–0.08% by mass of C existing as a cementite, and an inner layer of said sheet steel containing not more than 0.0050% by mass of C, and further containing at least one of 0.02–0.10% by mass of Ti, 0.01–0.10% by mass of Nb, 0.02–0.10% by mass of V and 0.03–0.10% by mass of Zr, the carbon being present substantially as carbides of the said elements, and the balance being Fe and inevitable impurities.

8. An extremely low carbon sheet steel as describes in claim 7, wherein the surface layer and the inner layer each contain 0.0001–0.0015% by mass of B.

9. An extremely low carbon sheet steel, as described in claim 7, wherein the surface layer contains 0.01–0.08% by mass of C, 0.05–0.40% by mass of Mn, 0.01–0.10% by mass of Al and not more than 0.0050% by mass of N, the balance being Fe and inevitable impurity elements, and the inner layer contains not more than 0.0050% by mass of C, 0.05–0.40% by mass of Mn, 0.01–0.10% by mass of Al, not more than 0.0050% by mass of N and 0.02–0.08% by mass of Ti, the balance being Fe and inevitable impurity elements.

10. An extremely low carbon sheet steel as described in claim 9, wherein the surface layer contains 0.01–0.08% by mass of C, 0.05–0.40% by mass of Mn, 0.01–0.10% by mass of Al, not more than 0.0050% by mass of N and 0.0001–0.0010% by mass of B, the balance being Fe and inevitable impurity elements, and the inner layer contains not more than 0.0050% by mass of C, 0.05–0.40% by mass of Mn, 0.01–0.10% by mass of Al, not more than 0.0050% by mass of N, 0.02–0.08% by mass of Ti and 0.0001–0.0010% by mass of B, the balance being Fe and inevitable impurity elements.

11. An extremely low carbon sheet steel, as described in claim 7, wherein the surface layer contains 0.01–0.08% by mass of C, 0.1–0.4% by mass of Mn, not more than 0.08% by mass of P, 0.01–0.10% by mass of Al and optionally further contains at least one of 0.01–0.08% by mass of Ti and 0.01–0.08% by mass of Nb, the balance being Fe and inevitable impurities, and an inner layer contains not more than 0.0050% by mass of C, 0.1–0.4% by mass of Mn, not more than 0.08% by mass of P and 0.01–0.10% by mass of Al, and further contains at least one of 0.02–0.08% by mass of Ti and 0.01–0.08% by mass of Nb, the balance being Fe and inevitable impurities.

12. An extremely low carbon sheet steel, as described in claim 11, wherein the surface layer and the inner layer each further contain 0.0001–0.0010% by mass of B.

13. An extremely low carbon sheet steel, as described in any one of claims 7–12, wherein total thickness of the surface layer on both sides of the sheet steel is not more than 8% of that of the inner layer.

14. An extremely low carbon sheet steel, as described in claim 13, wherein total thickness of the surface layer on both sides of the sheet steel is 2–8% of that of the inner layer.

15. A process for producing a continuously cast slab of extremely low carbon steel with less surface defects in a hot rolling, cold rolling, annealing or surface treatment step by continuous casting comprising applying a direct current magnetic field, which crosses the thickness of slab at a lower level position in the casting direction than the meniscus of molten steel poured into a continuously casting mold, to the molten steel, thereby forming a direct current magnetic field zone, and conducting casting while separating the molten steel into an upper molten steel pool and a lower molten steel pool by the direct current magnetic field zone, thereby forming a slab comprising a plurality of layers, where a surface layer and an inner layer have different steel compositions, characterized by pouring molten steel containing not more than 0.0050% by mass of C, not more than 1.5% by mass of Si, not more than 2.0% by mass of Mn, not more than 0.15% by mass of P, 0.01–0.15% by mass of Al and not more than 0.0050% by mass of N, the balance being Fe and inevitable impurities into the continuously casting mold, supplying carbon-containing powder to the surface of the upper molten steel pool separated by the direct current magnetic field zone, thereby adding 0.01–0.08% by mass of C to the surface layer, and inserting a Fe-coated alloy wire containing at least one of Ti, Nb, V and Zr into the lower molten steel pool, thereby adding at least one of 0.02–0.10% by mass of Ti, 0.01–0.10% by mass of Nb, 0.02–0.10% by mass of V and 0.03–0.10% by mass of Zr to the inner layer.

16. A process for producing a continuously cast slab of extremely low carbon steel with less surface defects in a hot rolling, cold rolling, annealing or surface treatment step, as described in claim 15, where the surface layer and the inner layer each further contain 0.0001–0.0015% by mass of B.

17. A process for producing a continuously cast slab of extremely low carbon steel, as described in claim 15, wherein the molten steel poured into the continuously cast mold is made to contain not more than 0.0025% by mass of carbon, and the inner layer is made to contain 0.025–0.040% by mass of Ti, and further a heating temperature for the hot rolling is made to be not more than 1,100° C.

18. A process for producing a continuously cast slab of extremely low carbon steel, as described in claim 17, wherein the inner layer further contains 0.01–0.02% by mass of Nb.

19. A process for producing a continuously cast slab of extremely low carbon steel, as described in any one of claims 15–17, wherein the powder contains 0.5–10% by mass of C.

20. A process for producing a continuously cast slab of extremely low carbon steel with less surface defects in a hot rolling, cold rolling, annealing or surface treatment step, as described in claim 15, by continuous casting comprising applying a direct current magnetic field, which crosses the thickness of slab at a lower level position in the casting direction than the meniscus of molten steel poured into a continuously casting mold, to the molten steel, thereby forming a direct current magnetic field zone, and conducting casting while separating the molten steel into an upper molten steel pool and a lower molten steel pool by the direct current magnetic field zone, thereby forming a slab comprising a plurality of layers, where a surface layer and an inner layer have different steel compositions, characterized by pouring molten steel containing not more than 0.0050% by mass of C, 0.1–0.4% by mass of Mn, not more than 0.08% by mass of P and 0.01–0.10% by mass of Al, and further containing at least one of 0.01–0.08% by mass of Ti and 0.01–0.08% by mass of Nb, the balance being Fe and inevitable impurities into the continuously casting mold, and supplying carbon-containing powder to the surface of the upper molten steel pool separated by the direct current magnetic field zone, thereby adding 0.01–0.08% by mass of C to the slab surface layer.

21. A process for producing a continuously cast slab of extremely low carbon steel as described in claim 20, where the surface layer and the inner layer each further contain 0.0001–0.0010% by mass of B.

22. A process for producing a continuously cast slab of extremely low carbon steel, as described in claim 20 or 21, wherein the powder contains 0.5–5% by mass of C.

23. A process for producing an extremely low carbon sheet steel with less surface defects in a steel sheet-making step by continuous casting comprising applying a direct current magnetic field, which crosses the thickness of slab at a lower level position in the casting direction than the meniscus of molten steel poured into a continuously casting mold, to the molten steel, thereby forming a direct current magnetic field zone, and conducting casting while separating the molten steel into an upper molten steel pool and a lower molten steel pool by the direct current magnetic field zone, thereby forming a slab comprising a plurality of layers, where a surface layer and an inner layer have different steel compositions, characterized by pouring molten steel containing not more than 0.0050% by mass of C, not more than 1.5% by mass Si, not more than 2.0% by mass of Mn, not more than 0.15% by mass of P, 0.01–0.15% by mass of Al and not more than 0.0050% by mass of N, the balance being Fe and inevitable impurities, into the continuously casting mold, supplying carbon-containing powder to the surface of the upper molten steel pool separated by the direct current magnetic field zone, thereby adding 0.01–0.08% by mass of C to the surface layer, inserting a Fe-coated alloy wire containing at least one of Ti, Nb, V and Zr into the lower molten steel pool, thereby adding at least one of 0.02–0.10% by mass of Ti, 0.01–0.10% by mass of Nb, 0.02–0.10% by mass of V and 0.03–0.10% by mass of Zr to the inner layer, thereby obtaining the continuously cast slab of extremely low carbon steel, and then subjecting the continuously cast slab to ordinary hot rolling, or ordinary hot rolling—pickling—cold rolling—recrystallization annealing or ordinary hot rolling—pickling—cold rolling—surface treatment.

24. A process for producing an extremely low carbon sheet steel, as described in claim 23, wherein the surface layer and the inner layer each further contain 0.0001–0.0015% by mass of B.

25. A process for producing an extremely low carbon sheet steel, as described in claim 23, wherein molten steel containing not more than 0.0050% by mass of C, 0.05–0.40% by mass of Mn, 0.01–0.10% by mass of Al and not more than 0.0050% by mass of N, the balance being Fe and inevitable impurity elements, is produced and then subjected to continuous casting, thereby obtaining a slab while providing an electromagnetic brake at mold, adding C-containing powder to the upper surface in the mold, thereby making the surface layer contain 0.01–0.08% by mass of C and inserting a Fe-coated wire of Ti alloy into the mold, thereby making the inner layer contain 0.02–0.08% by mass of Ti, and then the slab is subjected to ordinary hot rolling.

26. A process for producing an extremely low carbon sheet steel, as described in claim 25, wherein molten steel containing not more than 0.0050% by mass of C, 0.05–0.40% by mass of Mn, 0.01–0.10% by mass of Al, not more than 0.0050% by mass of N and 0.0001–0.0010% by mass of B, the balance being Fe and inevitable impurity elements, is produced and then subjected to continuous casting, thereby obtaining a slab, while providing an electromagnetic brake at a mold, adding C-containing powder to the upper surface in the mold, thereby making the surface layer contain 0.01–0.08% by mass of C and inserting a Fe-coated wire of Ti alloy into the mold, thereby making the inner layer contain 0.02–0.08% by mass of Ti, and the slab is subjected to ordinary hot polling.

27. A process for producing an extremely low carbon sheet steel with less surface defects in a steel sheet-producing step, as described in claim 23, by continuous casting comprising applying a direct current magnetic field, which crosses the thickness of slab at a lower level position in the casting direction than the meniscus of molten steel poured into a continuously casting mold, to the molten steel, thereby forming a direct current magnetic field zone, and conducting casting while separating the molten steel into an upper molten steel pool and a lower molten steel pool by the direct current magnetic field zone, thereby forming a slab comprising a plurality of layers, where a surface layer and an inner layer have different steel compositions, characterized by pouring molten steel containing not more than 0.0050% by mass of C, 0.1–0.4% by mass of Mn, not more than 0.08% by mass of P and 0.01–0.10% by mass of Al, and further containing at least one of 0.01–0.08% by mass of Ti and 0.01–0.08% by mass of Nb, the balance being Fe and inevitable impurities into the continuously casting mold, and supplying carbon-containing powder to the surface of the upper molten steel pool separated by the direct current magnetic field zone, thereby adding 0.01–0.08% by mass of C to the slab surface layer to produce a continuously cast slab of extremely low carbon steel, and then further subjecting the continuously cast slab of extremely low carbon steel to ordinary hot rolling or ordinary hot rolling—pickling—cold rolling—recrystallization annealing or hot rolling—pickling—cold rolling—surface treatment.

28. A process for producing an extremely low carbon sheet steel, as described in claim 27, wherein the surface layer and the inner layer each further contain 0.0001–0.0010% by mass of B.

29. A process for producing an extremely low carbon sheet steel, as described in any one of claims 23–28, wherein the ordinary hot rolling—pickling—cold rolling is carried out and the recrystallization annealing and galvanizing are carried out in a continuous hot dip galvanizing line.

30. A process for producing an extremely low carbon sheet steel, as described in any one of claims 23–28, wherein the treatment in the continuous hot dip galvanizing line is carried out by galvanizing and then an ordinary alloying treatment to zinc phase.

31. A process for producing an extremely low carbon sheet steel, as described in any one of claims 23–28, wherein the hot rolling is carried out on the continuously cast slab in the ordinary manner comprising subjecting the slab to direct hot rolling at 1,050°–1,200° C. or heating—rough rolling—finish rolling, where the finish rolling end temperature is above the $Ar_3$ tranformation point or may be below the $Ar_3$ transformation point within a range of evading a ridging-like skin toughening, followed by cooling, coiling at about 550°–690° C., further cooling, pickling if required and an appropriate finishing treatment, thereby obtaining a hot rolled steel sheet or hot rolled coil.

32. A process for producing an extremely low carbon sheet steel, as described in claim 31, therein the finish rolling end temperature is [$Ar_3$ transformation point—20] –950° C.

33. A process for producing an extremely low carbon sheet steel, as described in any one of claims 23–28, wherein in the hot rolling—pickling—cold rolling—recrystallization annealing, cold rolling is carried out in the ordinary manner comprising cold rolling the pickled, hot rolled coil in a cold rolled ratio of 60–85%, and conducting the recrystallization annealing by box annealing under annealing conditions of 650°–750° C. for 1–20 hours, or by continuous annealing under annealing conditions of 700°–900° C. for 10 sec. to 10 min., thereby obtaining a cold rolled steel sheet or a cold rolled coil.

34. A process for producing an extremely low carbon sheet steel, as described in any one of claims 23–28, wherein in the hot rolling—pickling—cold rolling—surface treatment, the surface treatment is carried out in the ordinary manner comprising passing the cold rolled coil through an electrogalvanizing line or an electrogalvanizing-alloying line, thereby obtaining a pure zinc coated steel sheet or zinc alloy coated steel sheet.

35. A process for producing an extremely low carbon sheet steel, as described in claim 34, wherein the electrogalvanizing is an ordinarly pure zinc plating.

36. A process for producing an extremely low carbon sheet steel, as described in claim 34, wherein the electrogalvanizing-alloying is plating of Zn—Ni alloy containing zinc as the major component.

37. A process for producing an extremely low carbon sheet steel, as described in any one of claims 23–28, wherein in the hot rolling—pickling—cold rolling—surface treatment, the surface treatment is carried out in the ordinary manner comprising passing the cold rolled coil through a continuous hot dip galvanizing line under conditions of 700°–900° C. for 10 sec.–10 min., thereby obtaining a hot dip galvanized steel sheet.

38. A process for producing an extremely low carbon sheet steel, as described in any one of claims 23–28, wherein in the hot rolling—pickling—cold rolling—surface treatment, the surface treatment is carried out in the ordinary manner comprising passing the cold rolled coil through a continuous hot dip galvanizing line under conditions of 700°–900° C. for 10 sec.–10 min., thereby obtaining a hot dip galvanized steel sheet and then making a galvannealed steel sheet at a pot dipping temperature of 420°–480° C., under alloying conditions of 480°–600° C. for 1–60 sec., and in a modification rolling ratio of 0.2–2% and a zinc deposit of 20–120 g/m².

\* \* \* \* \*

UNITED STATES PATENT AND TRADEMARK OFFICE
CERTIFICATE OF CORRECTION

PATENT NO. : 5,578,143  Page 1 of 2
DATED : November 26, 1996
INVENTOR(S) : Kazuo KOYAMA, Eiichi TAKEUCHI, and Masayoshi SUEHIRO

It is certified that error appears in the above-indentified patent and that said Letters Patent is hereby corrected as shown below:

Claim 23, at column 26, line 22, after "mass" (second occurrence), insert --of--;

Claim 31, at column 28, line 4, change "toughening" to --roughening--; and

UNITED STATES PATENT AND TRADEMARK OFFICE
CERTIFICATE OF CORRECTION

PATENT NO. : 5,578,143
DATED : November 26, 1996
INVENTOR(S) : Kazuo KOYAMA, ET AL.

It is certified that error appears in the above-indentified patent and that said Letters Patent is hereby corrected as shown below:

Claim 32, at column 28, line 9, change "therein" to --wherein--; and line 10, after "point" change the dash ("—") to a hyphen (-- - --) to designate a minus sign.

Signed and Sealed this

Sixth Day of May, 1997

Attest:

BRUCE LEHMAN

*Attesting Officer*

*Commissioner of Patents and Trademarks*